(12) United States Patent
Rice

(10) Patent No.: US 6,758,484 B1
(45) Date of Patent: Jul. 6, 2004

(54) CRASH BAR FOR MOTORCYCLES

(76) Inventor: Henry Rice, 4280 E. 175th St., Cleveland, OH (US) 44128

( * ) Notice: Subject to any disclaimer, the term of this patent is extended or adjusted under 35 U.S.C. 154(b) by 0 days.

(21) Appl. No.: 10/264,708

(22) Filed: Oct. 4, 2002

(51) Int. Cl.⁷ ............................................. B62J 27/00
(52) U.S. Cl. .................... 280/304.4; 280/291; 280/784; 180/219; 293/105
(58) Field of Search .......................... 293/105, 75, 188; 180/219; 280/784, 304.3, 304.4, 291, 748, 755, 756

(56) References Cited

U.S. PATENT DOCUMENTS

| | | | |
|---|---|---|---|
| 2,126,752 A | * | 8/1938 | Devine et al. ............ 280/304.3 |
| 2,171,042 A | * | 8/1939 | Minton ........................ 180/219 |
| 3,902,740 A | * | 9/1975 | Lucier et al. ............. 280/304.3 |
| 4,010,812 A | | 3/1977 | Bothwell |
| 4,136,890 A | | 1/1979 | Vertucci |
| 4,304,315 A | * | 12/1981 | Hirakawa et al. .......... 180/89.1 |
| 4,377,295 A | * | 3/1983 | Lemman ..................... 280/303 |
| 4,768,799 A | | 9/1988 | Millican |
| 4,852,900 A | * | 8/1989 | Nahachewski .............. 280/291 |
| 5,036,947 A | | 8/1991 | Metzger |
| 5,106,136 A | * | 4/1992 | Crain .......................... 293/105 |
| 5,524,918 A | | 6/1996 | Peabody et al. |
| D395,024 S | | 6/1998 | Baratti |
| 5,924,715 A | | 7/1999 | Norem |
| 6,042,171 A | | 3/2000 | Hesse |
| 6,131,427 A | | 10/2000 | Webber et al. |
| 6,152,474 A | | 11/2000 | Rupert |
| 6,161,859 A | | 12/2000 | Cheng |
| 6,179,313 B1 | | 1/2001 | Christensen |
| 6,406,046 B1 | * | 6/2002 | Harrell ........................ 280/202 |

* cited by examiner

Primary Examiner—Avraham Lerner
(74) Attorney, Agent, or Firm—John D. Gueliotta; P. Jeff Martin

(57) ABSTRACT

A crash bar adapted to be mounted specifically to HARLEY-DAVIDSON SPORTSTER® and EVOLUTION® motorcycle models from 1986 to present is provided to support a rider's feet in a more comfortable and stable riding position. The crash bar is designed and configured so as to prevent slippage of rider's feet therefrom and to provide the motorcycle with protection against damage should the motorcycle fall over. The crash bar is of a tubular configuration constructed of steel and defines a C-shaped portion serving as a first foot support surface, while a top member provides a second foot support surface. Spherical-shaped, chrome abutment elements are welded to the crash bar and provide a restraint against which rider's feet bear, thus preventing rider's feet from slipping while riding.

11 Claims, 4 Drawing Sheets

CRASH BAR FOR MOTORCYCLES

RELATED APPLICATIONS

The present invention was first described in Disclosure Document Registration No. 514,458 filed on Jul. 1, 2002 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to accessories for motorcycles and, more particularly, to a crash bar for motorcycles.

2. Description of the Related Art

Over the last several years, motorcycles have increased in popularity. Many enjoy the pleasure and freedom provided by their bike when commuting or touring across country. As popularity has risen, so have manufacturers' production of designs for accommodating the latest style, performance, technology and basic consumer demands. However, when touring across country or when traveling over significant distances, many riders experience discomfort in their legs and feet due to a lack of selectivity when positioning their feet; a problem which has continued to go unaddressed.

Accordingly, there is a need for a device which supports a motorcycle rider's feet in a stable and more comfortable riding position in a manner which is quick, easy, and effective. The development of the crash bar for motorcycles fulfills this need.

A search of the prior art did not disclose any patents that read directly on the claims of the instant invention; however, the following references were considered related.

U.S. Pat. No. 4,136,890 issued in the name of Vertucci discloses a combination leg shield and crash bar for motorcycles.

U.S. Pat. No. 6,042,171 issued in the name of Hesse discloses a deflector mounted on each side of a motorcycle designed to protect rider against wind pressure.

U.S. Pat. No. 6,179,313 B1 issued in the name of Christensen discloses a motorcycle exhaust pipe heat shield and method of making the same.

U.S. Pat. No. 6,152,474 issued in the name of Rupert discloses an adjustable motorcycle foot rest being removably coupled to the crash bar.

U.S. Pat. No. 6,131,427 issued in the name of Webber et al. discloses a combination foot peg/lock holder for a motorcycle.

U.S. Pat. No. 5,524,918 issued in the name of Peabody et al. discloses a telescopic foot- rest for a motorcycle.

U.S. Pat. No. 6,161,859 issued in the name of Cheng discloses a foot peg for a motorcycle having a replaceable friction member.

U.S. Pat. No. 5,036,947 issued in the name of Metzger discloses a shield securable to an exhaust pipe which provides protection from heat given off by the exhaust pipe.

U.S. Pat. No. 4,768,799 issued in the name of Millican discloses a footguard for three-wheeled or four-wheeled motorcycles.

U.S. Pat. No. 4,010,812 issued in the name of Bothwell discloses a motorcycle frame.

And, U.S. Pat. Des. No. 395,024 issued in the name of Baratti discloses the ornamental design for a heel guard for motorcycle heel rest.

Consequently, a need has been felt for a device which supports a motorcycle rider's feet in a stable and more comfortable riding position in a manner which is quick, easy, and effective.

SUMMARY OF THE INVENTION

Therefore, it is an object of the present invention to provide a crash bar adapted to be mounted specifically to HARLEY-DAVIDSON SPORTSTER® and EVOLUTION® models from 1986 to present in order to provide rider with a means for supporting rider's feet in a more comfortable and stable riding position.

It is still another object of the present invention to provide a crash bar mountable to a conventional motorcycle which provides protection against damage should the motorcycle fall over.

It is still another object of the present invention to provide a crash bar constructed of tubular, chrome metal.

It is another object of the present invention to provide a crash bar being easily mounted to the frame of a conventional motorcycle via nut and bolt assemblies.

It is another object of the present invention to provide a plurality of foot support surfaces from which rider may select.

It is another object of the present invention to provide a plurality of spherical-shaped, chrome abutment elements serving as restraints against which a lateral, outer edge of rider's feet bear, thus preventing rider's feet from slipping from the crash bar while riding.

Briefly described according to one embodiment of the present invention, a crash bar for motorcycles is provided and includes a crash bar adapted to be mounted specifically to HARLEY-DAVIDSON SPORTSTER® and EVOLUTION® models from 1986 to present in order to provide rider with a means for supporting rider's feet in a more comfortable and stable riding position. The crash bar is designed and configured so as to prevent slippage of rider's feet therefrom and to provide the motorcycle with protection against damage should the motorcycle fall over. The crash bar is of a tubular configuration constructed of steel and defines an elongated, horizontally-oriented top member having opposing ends which extend vertically downward a length therefrom at an angle of approximately 90° until curving outward so as to form a generally C-shaped portion. Each C-shaped portion provides a first foot support surface.

A lower end of each C-shaped portion extends downward and inward so as to form an arcuate-shaped portion. Each arcuate-shaped portion terminates into a flange which is mounted to the metal frame of the motorcycle.

The top member provides a second foot support surface, thereby providing rider with a plurality of foot-resting positions from which to select to facilitate comfort. The top member is mounted to the metal frame along an upper portion thereof, adjacent to the engine, via an interconnecting means.

A plurality of spherical-shaped, chrome abutment elements are welded to each opposing end of the top member. An abutment element is also welded to each C-shaped portion. The abutment elements provide a restraint against which a lateral, outer edge of rider's feet bear, thus preventing rider's feet from slipping from the crash bar while riding.

The use of the present invention serves not only to support a motorcycle rider's feet in a stable and more comfortable riding position, but also serves to provide the motorcycle with protection against damage should the motorcycle fall over.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

A. Detailed Description of the Figures

Figure 1:
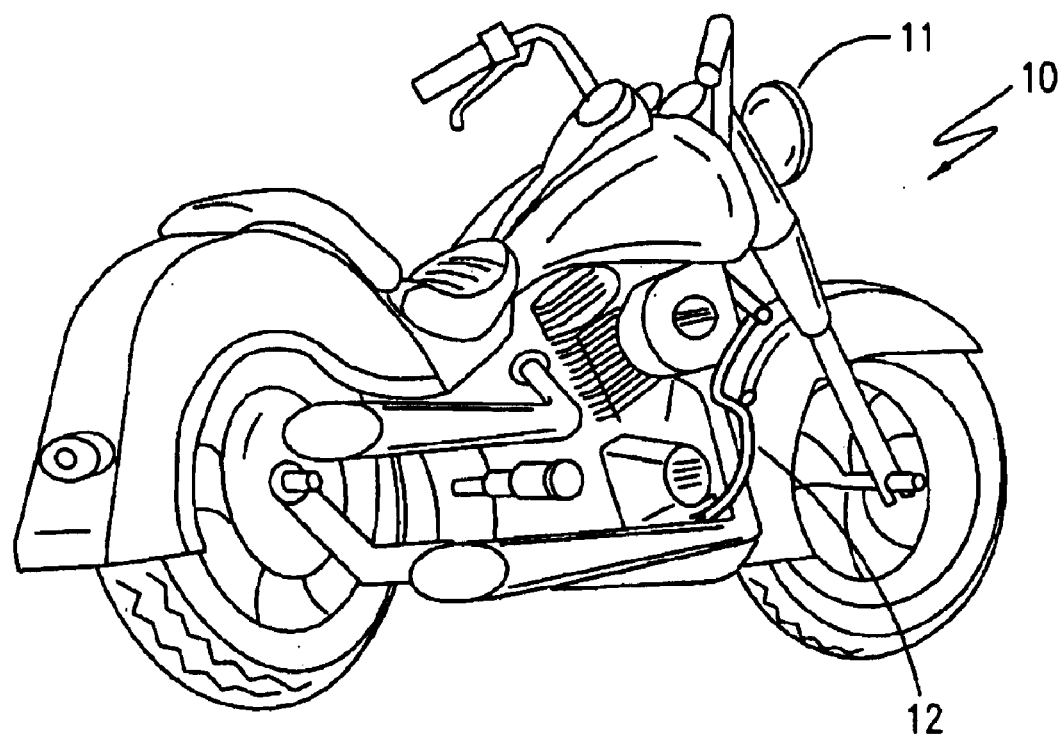
FIG. 1 is a perspective view of a crash bar shown mounted to a HARLEY-DAVIDSON SPORTSTER® motorcycle according to the preferred embodiment of the present invention.
Figure 2:
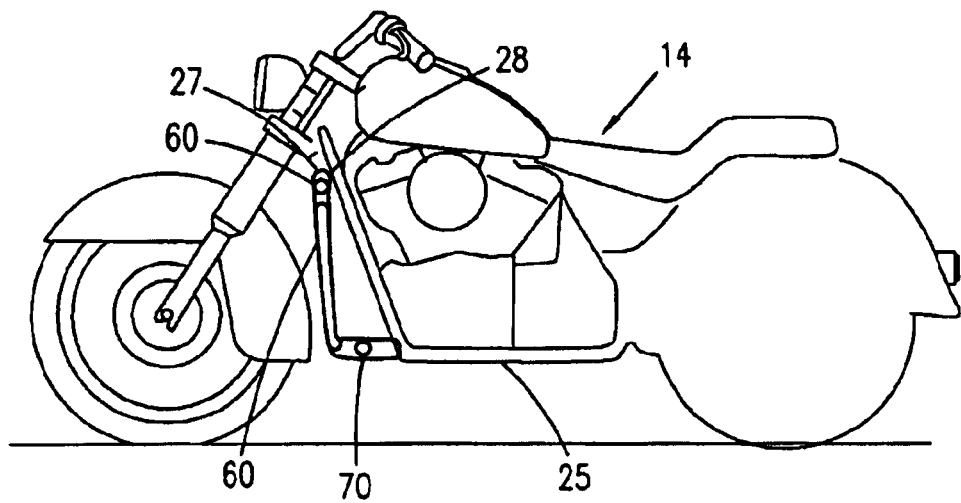
FIG. 2 is a side elevational view of the crash bar shown mounted to a conventional motorcycle according to the preferred embodiment of the present invention.
Figure 3:
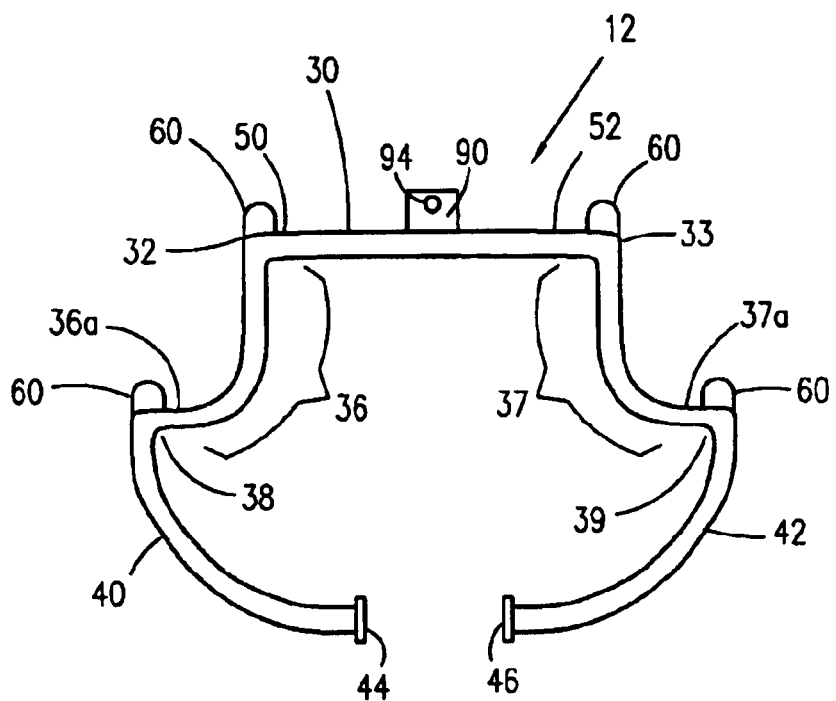
FIG. 3 is a front end view of the crash bar according to the preferred embodiment of the present invention.
Figure 4:
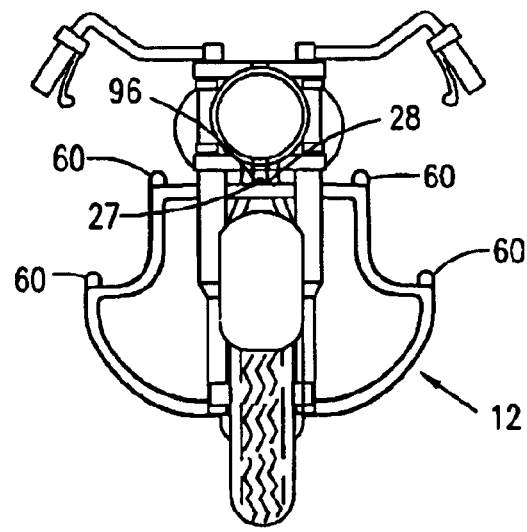
FIG. 4 is a front end view of the crash bar shown mounted to a conventional motorcycle according to the preferred embodiment of the present invention.

Referring now to FIGS. 1–4, a crash bar for motorcycles 10 is shown, according to the present invention, comprised of a crash bar 12 adapted to be mounted specifically to HARLEY-DAVIDSON SPORTSTER® and EVOLUTION® models 11 from 1986 to present in order to provide rider with a means for supporting rider's feet in a more comfortable and stable riding position. However, it is envisioned that the crash bar 12 may be manufactured in such a manner so as to be adapted to be mounted to a road worthy conventional motorcycle 16. Such embodiment would merely entail slight modification in the mounting means, as will be described later in greater detail. For purposes of this disclosure, the aforementioned HARLEY-DAVIDSON models 11 are to be hereinafter referred to as motorcycle 14.

The crash bar 12 is designed and configured so as to prevent slippage of riders feet therefrom and to provide the motorcycle 14 with protection against damage should the motorcycle 14 fall over. The crash bar 12 is preferably constructed of tubular, chrome metal. It is envisioned that the crash bar 12 may be constructed alternatively of nickel-plated steel, or steel having a brushed-black finish. The crash bar 12 defines an elongated, horizontally-oriented top member 30 having opposing ends 32, 33 extending vertically downward a length therefrom at an angle of approximately 90° until curving outward so as to form a generally C-shaped portion 36, 37. Each C-shaped portion 36, 37 provides a first foot support surface 36a, 37a, respectively.

A lower end 38, 39 of each C-shaped portion 36, 37 extends downward and inward so as to form an arcuate-shaped portion 40, 42 lying in proximal, parallel alignment with top member 30. Each arcuate-shaped portion 40, 42 terminates into a flange 44, 46, respectively. Each flange 44, 46 is mounted to the metal frame 25 of the motorcycle 14 below the engine 26 by a nut and bolt assembly 70.

The top member 30 provides a second foot support surface 50, 52, thereby providing rider with a plurality of foot-resting positions from which to select to facilitate comfort. The top member 30 is mounted to the metal frame 25 along an upper portion thereof, adjacent to the engine 26, via an interconnecting flange 90. The interconnecting flange 90 is integrally molded along a linearly elongated centerline of an upper surface of the top member 30. The interconnecting flange 90 is designed so as to be slidably received within a slot 27 formed integral to a frame 25 of motorcycle 14, wherein the slot 27 has a hole 28 to which a hole 94 formed in interconnecting flange 90 is aligned for mounting. The interconnecting flange 90 is mounted within the slot 27 via a bolt 96 inserted through the hole 28 of slot 27, through the hole 94 of interconnecting flange 90, and finally being threadedly received by a nut 29 which is welded to frame 25.

A plurality of spherical-shaped, chrome abutment elements 60 are provided and impart important functional utility to the present invention as will be described hereinbelow. An abutment element 60 is welded to each opposing end 32, 33 of the top member 30 along an upper external circumferential surface thereof, adjacent to each second foot support surface 50, 52. An abutment element 60 is also welded to each C-shaped portion 36, 37 near the lower end 38, 39 thereof, adjacent to each first foot support surface 36a, 37a along an upper external circumferential of each C-shaped portion 36, 37. The abutment elements 60 provide a restraint against which a lateral, outer edge of rider's feet bear, thus preventing rider's feet from slipping from the crash bar 12 while riding.

It is envisioned that the abutment elements 60 may be constructed alternatively of nickel-plated steel, or steel having a brushed-black finish so as to coincide with the crash bar 12 of like construction.

Figure 5:
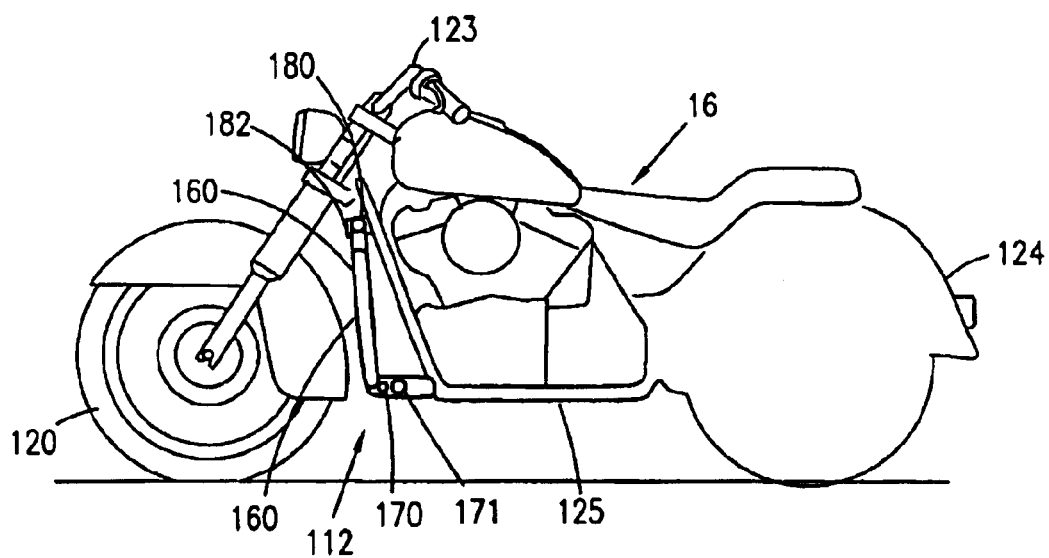
FIG. 5 is a side elevational view of the crash bar shown mounted to a conventional motorcycle according to an alternate embodiment of the present invention.
Figure 6:
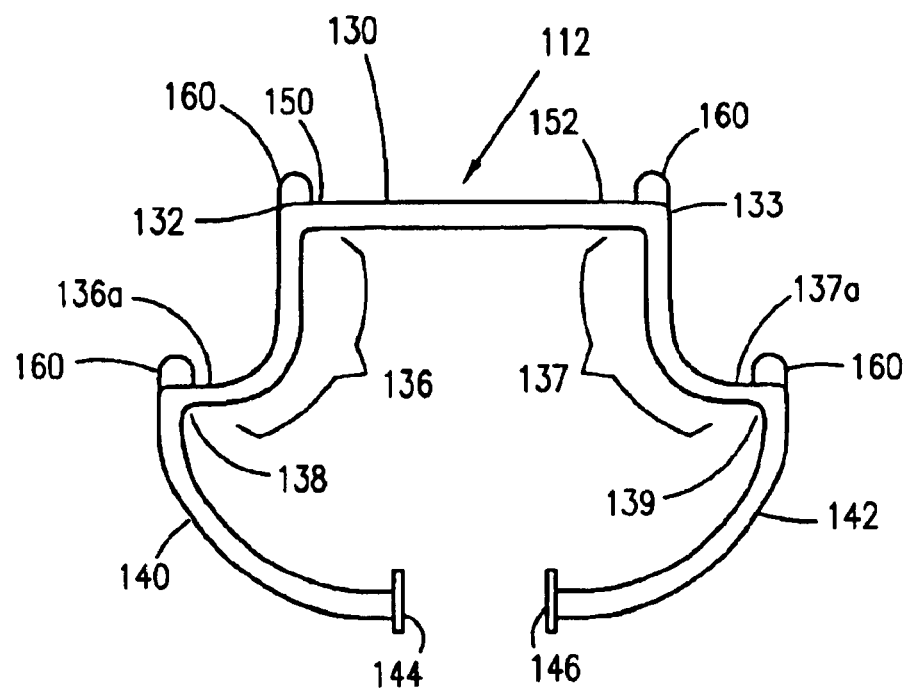
FIG. 6 is a front end view of the crash bar according to the alternate embodiment of the present invention.
Figure 7:
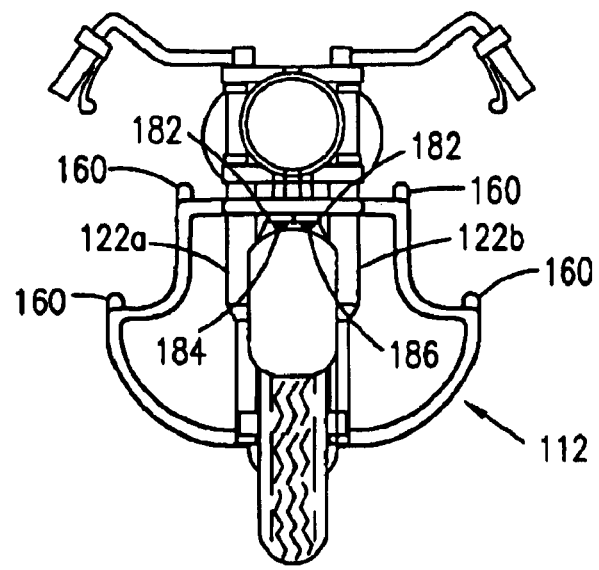
FIG. 7 is a front end view of the crash bar shown mounted to a conventional motorcycle according to the alternate embodiment of the present invention.

Referring now to FIGS. 5–7, an alternate embodiment of the present invention is provided, wherein a crash bar 112 is adapted to be mounted to a road worthy conventional motorcycle 16 in order to provide rider with a means for supporting rider's feet in a more comfortable and stable riding position. Like the preferred embodiment, crash bar 112 is designed and configured so as to prevent slippage of rider's feet therefrom and to provide the motorcycle 16 with protection against damage should the motorcycle 16 fall over.

For purposes of this disclosure, the term "conventional motorcycle" is defined as including a front wheel 120 rotatably supported on a pair of longitudinally spaced front forks 122a, 122b. The front wheel 120 is steerable by handlebars 123 mounted to the pair of front forks 122a, 122b and supported by a metal frame 125. An engine 126 is mounted on the metal frame 125 between the front wheel 120 and a rear wheel 124 and below a rider.

The crash bar 112 is preferably constructed of tubular, chrome metal. It is envisioned that the crash bar 112 may be constructed alternatively of nickel-plated steel, or steel having a brushed-black finish. The crash bar 112 defines an elongated, horizontally-oriented top member 130 having opposing ends 132, 133 extending vertically downward a length therefrom at an angle of approximately 90° until curving outward so as to form a generally C-shaped portion 136, 137. Each C-shaped portion 136, 137 provides a first foot support surface 136a, 137a, respectively.

A lower end 138, 139 of each C-shaped portion 136, 137 extends downward and inward so as to form an arcuate-shaped portion 140, 142 lying in proximal, parallel alignment with top member 130. Each arcuate-shaped portion 140, 142 terminates into a flange 144, 146, respectively. Each flange 144, 146 is mounted to the metal frame 125 of the motorcycle 16 below the engine 126 by a pair of nut and bolt assemblies 170, 171.

The top member 130 provides a second foot support surface 150, 152, thereby providing rider with a plurality of foot-resting positions from which to select to facilitate comfort. The top member 130 is mounted to the metal frame 125 along an upper portion thereof, adjacent to the engine 126, via an interconnecting means 180. The interconnecting means 180 is shown herein as a bracket 182 which mountably secures the top member 130 along a linearly elongated centerline thereof by a pair of nut and bolt assemblies 184, 186 to the metal frame 125.

A plurality of spherical-shaped, chrome abutment elements 160 are provided. An abutment element 160 is welded to each opposing end 132, 133 of the top member 130 along an upper external circumferential surface thereof, adjacent to each second foot support surface 150, 152. An abutment element 160 is also welded to each C-shaped portion 136, 137 near the lower end 138, 139 thereof, adjacent to each first foot support surface 136a, 137a along an upper external circumferential surface of each C-shaped portion 136, 137.

An advantage of the present invention is that it imparts stability to the motorcycle 14 when riding in high winds at high rates of speed and during periods of rain.

2. Operation of the Preferred Embodiment

To use the present invention, when riding the motorcycle 14, user simply places feet on a desired foot support surface 36a, 37a, 50, 52 with the lateral, outer edge of user's feet placed against respective abutment elements 60. In this manner, the rider's feet are prevented from slipping from the crash bar while riding.

The use of the present invention serves not only to support a motorcycle rider's feet in a stable and more comfortable riding position, but also serves to provide the motorcycle with protection against damage should the motorcycle fall over.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A crash bar accessory for motorcycles comprising:
a crash bar, said crash bar is constructed of tubular metal, and wherein said crash bar is adapted to be mounted to a motorcycle in order to provide rider with a means for supporting rider's feet in a more comfortable and stable riding position, as well as provide motorcycle with protection against damage should the motorcycle fall over; and
a plurality of spherical-shaped, chrome abutment elements, said plurality of spherical-shaped, chrome abutment elements is adapted to provide a restraint against which a lateral, outer edge of rider's feet bear, thus preventing rider's feet from slipping from said crash bar while riding the motorcycle;
wherein said crash bar has a chrome finish and defines an elongated, horizontally-oriented top member, said elongated, horizontally-oriented top member has opposing ends wherein each of said opposing ends extends vertically downward a length at an angle of approximately 90° until curving outward so as to form a generally C-shaped portion, wherein said generally C-shaped portion provides a first foot support surface, said generally C-shaped portion has a lower end which extends downward and inward so as to form an arcuate-shaped portion, said arcuate-shaped portion terminates into a flange, and wherein said elongated, horizontally-oriented top member provides a second foot support surface, thereby providing a rider with a plurality of foot-resting positions from which to select to facilitate comfort.

2. The crash bar accessory for motorcycles of claim 1, wherein said elongated, horizontally-oriented top member is mounted to a metal frame of the motorcycle via an interconnecting flange along an upper portion of the metal frame being adjacent to an engine.

3. The crash bar accessory for motorcycles of claim 2, wherein said interconnecting flange is integrally molded along a linearly elongated centerline of an upper surface of said elongated, horizontally-oriented top member, said interconnecting flange is designed so as to be slidably received within a slot formed integral to the frame of the motorcycle, wherein the slot has a hole to which a hole formed in said interconnecting flange is aligned for mounting, and wherein said interconnecting flange is mounted within the slot via a bolt inserted through the hole of slot, through said hole of said interconnecting flange, and threadedly received by a nut which is welded to the frame of the motorcycle.

4. The crash bar accessory for motorcycles of claim 1, wherein said flange is mounted to the metal frame of the motorcycle below the engine by a nut and bolt assembly.

5. The crash bar accessory for motorcycles of claim 1, wherein each end of said opposing ends is welded with a first abutment element of said plurality of spherical-shaped, chrome abutment elements along an upper external circumferential surface of said elongated, horizontally-oriented top member, adjacent to a respective said second foot support surface, and wherein a second abutment element of said plurality of spherical-shaped, chrome abutment elements is welded to each said generally C-shaped portion near said lower end of said generally C-shaped portion, adjacent to a respective said first foot support surface along an upper external circumferential surface of each said generally C-shaped portion.

6. The crash bar accessory for motorcycles of claim 1, wherein said crash bar is constructed of tubular, nickel-plated steel.

7. The crash bar accessory for motorcycles of claim 1, wherein said crash bar is constructed of tubular steel having a brushed-black finish.

8. A crash bar accessory for motorcycles comprising:
a crash bar, said crash bar is constructed of tubular metal, and wherein said crash bar is adapted to be mounted to a road worthy motorcycle in order to provide rider with a means for supporting rider's feet in a more comfortable and stable riding position, as well as provide the road worthy motorcycle with protection against damage should the road worthy motorcycle fall over, and wherein said crash bar defines an elongated, horizontally-oriented top member, said elongated, horizontally-oriented top member has opposing ends wherein each of said opposing ends extends vertically downward a length at an angle of approximately 90° until curving outward so as to form a generally C-shaped portion, wherein said generally C-shaped portion provides a first foot support surface, and wherein said generally C-shaped portion has a lower end which extends downward and inward so as to form an arcuate-shaped portion, said arcuate-shaped portion terminates into a flange, wherein said flange is mounted to a metal frame of the road worthy motorcycle below an engine of the road worthy motorcycle by a pair of nut and bolt assemblies; and a plurality of spherical-shaped, metal abutment elements.

9. The crash bar accessory for motorcycles of claim 8, wherein said elongated, horizontally-oriented top member is mounted to the metal frame of the road worthy motorcycle along an upper portion of the metal frame, adjacent to an engine of the road worthy motorcycle, via an interconnecting means.

10. The crash bar accessory for motorcycles of claim 9, wherein said interconnecting means is defined as a bracket which mountably secures said elongated, horizontally-oriented top member to the metal frame of the road worthy motorcycle along a linearly elongated centerline of said elongated, horizontally-oriented top member by a pair of nut and bolt assemblies.

11. The crash bar accessory for motorcycles of claim 8, wherein an abutment element of said plurality of spherical-shaped, metal abutment elements is welded to each of said opposing ends of said elongated, horizontally-oriented top member along an upper external circumferential surface of said elongated, horizontally-oriented top member, adjacent to a respective said second foot support surface, and wherein an abutment element of said plurality of spherical-shaped, chrome abutment elements is welded to each said generally C-shaped portion near said lower end of said generally C-shaped portion, adjacent to a respective said first foot support surface along an upper external circumferential surface of each said generally C-shaped portion.

* * * * *